No. 12,329. REISSUED MAR. 21, 1905.

I. S. BUNKER.

FIRE AND BURGLAR ALARM.

APPLICATION FILED MAR. 1, 1904.

Inventor

Ira S. Bunker

Witnesses.

Jno. Wheeler.

By J. J. Geisler

Attorney

PHOTO LITHOGRAPHED BY SACKETT & WILHELMS LITHG. & PTG. CO. NEW YORK.

No. 12,329. Reissued March 21, 1905.

UNITED STATES PATENT OFFICE.

IRA S. BUNKER, OF FREEWATER, OREGON.

FIRE AND BURGLAR ALARM.

SPECIFICATION forming part of Reissued Letters Patent No. 12,329, dated March 21, 1905.

Original No. 719,563, dated February 3, 1903. Application for reissue filed March 1, 1904. Serial No. 196,252.

*To all whom it may concern:*

Be it known that I, IRA S. BUNKER, a citizen of the United States, residing at Freewater, in the county of Umatilla, State of Oregon, have invented a new and useful Improvement in Fire and Burglar Alarms, of which the following is a specification, reference being had to the accompanying drawings as constituting a part thereof.

My invention has for its object to obtain a reliable device serviceable both as a fire and burglar alarm, but which is made as simple and inexpensively as possible.

I attain my object by the construction, arrangement, and combination of the contrivances hereinafter described.

Figure 1:
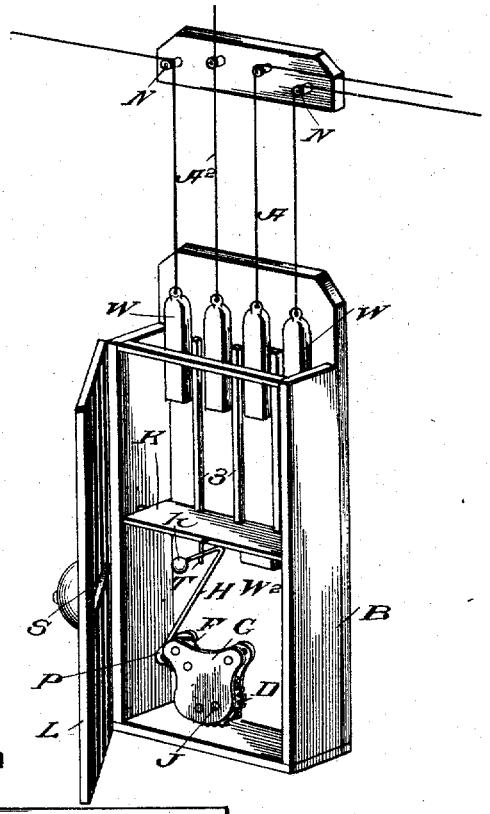
Figure 2:
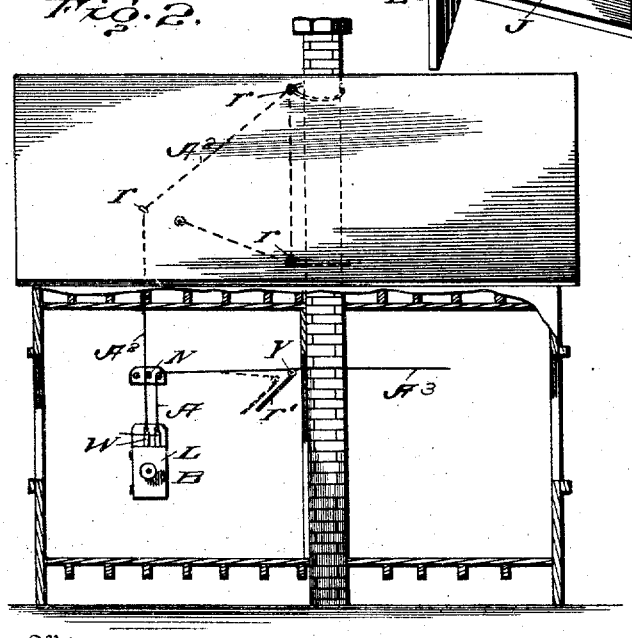

In the drawings, Figure 1 is a perspective elevation of my invention ready for use, the door of the case being shown as opened to disclose the interior mechanism. Fig. 2 is an elevation of a building, partly in section, and illustrates the manner of installing and using my alarm.

The reference characters designate the parts referred to in the drawings.

B represents a box or case of any convenient shape or size. The back wall of the case is provided with vertical rails constituting ways for the weights W to slide in when released. Said weights may be suspended by any convenient and effective means. Those shown in the drawings comprise cords A, which are led to the several parts of the building over suitably-positioned knobs N, preferably of porcelain.

A cord $A^2$ is supposed to extend to the attic or upper part of the building through screw-eyes *r*. Other cords suspending weights W may be led by like means to any part of the room or into an adjoining room, as indicated by the cord Y, for example, in Fig. 2. The eyes of the guiding screw-eyes should be made as smooth as possible, (for which purpose said eyes may be enameled with glass,) so as to insure that the weight-suspending cords when released will slip through the eyes and allow the weights to drop for the purpose of actuating the alarm, as presently will be explained.

As shown in the drawings, the releasing of the weight-suspending cords is brought about by the burning in case of a fire in the building. The adaptation of my invention to be used as a burglar-alarm and the arrangement of the restraining-cords under such circumstances, so as to be released by the opening of a window, for example, so readily suggests itself as to require neither specific description nor illustration.

Below the weights W is a tilting plate or member K, pivoted at its two ends in the sides of the case B. On the front end of the plate K is secured a weight $W^2$, which operates to hold said plate in its normal position, causing the inner edge of said plate to bear against the bottom ends of the rails 3 and in this manner sustaining said plate in a horizontal position. The front or outer edge of the plate K is further provided with a dependent finger or member T, which operates as a detent, as it were, engaging with and holding the vibrating hammer H of the alarm mechanism G, and thus preventing the alarm mechanism from acting so long as the plate K remains in its normal position.

Upon either of the weights W being released the same will fall upon the inner edge of the plate K and tilt the same, with the effect of disengaging the member T from the hammer-arm H and allowing the alarm mechanism to operate.

The alarm mechanism comprises a drive-wheel D, a winding-shaft J, an escape-wheel F, and a pivoting pawl or anchor P, and from said anchor projects a hammer-arm H, provided at its extremity with a knob *h*. As shown in the drawings, Fig. 1, the extremity of the hammer-arm H projects outwardly of the case through a slot S in the door L, over which slot S is secured a bell. Thus when the door L is closed the hammer-arm will be enabled to strike and ring the bell upon the alarm mechanism being released. I do not confine myself, however, to the particular construction described with respect to the hammer-arm of the alarm mechanism nor to the particular means for restraining the alarm mechanism against action. It is self-evident that in an alarm mechanism of the construction indicated by G in the drawings one of the simplest ways of arresting the action of the alarm is to temporarily hold the anchor P against its operating power. I have therefore extended the hammer-arm H for some length and bring the same in direct contact with the finger T, and thus the hammer-arm besides striking the bell also affords the means for restraining the alarm mechanism. By reason of the length of the hammer-arm but little power is required to hold the same at its extremity. There is therefore but little friction on the detaining-finger T, and a small weight thrown on the inner edge of the plate K will suffice to tilt the latter and disengage the finger from the hammer-arm.

When it is deemed more convenient to make the case or box of my alarm of another shape than that shown and to that end to differently arrange the coöperating parts, it may become necessary to somewhat modify the described means for restraining the alarm mechanism.

The operation of my invention is apparent from the foregoing description thereof.

The advantages which I obtain in my invention are several. It dispenses with all unnecessary and more or less complicated contrivances usually found in like constructions without rendering my device less delicate and efficient in its action. The tilting plate can be so delicately balanced that the weight of one-fourth of an ounce dropped on its back edge will be sufficient to tilt the same and set off the alarm. The weights W not being required to be heavy, small cords can be used for suspending the same, and the elasticity of the cords will not be excessively strained, and therefore my alarm mechanism will remain in order for some considerable time.

Having fully described my invention, what I claim, and what I desire to secure by Letters Patent, is—

1. An alarm comprising a case, sliding weights independently supported in the case, a plate pivoted at its ends in the case with its rear portion lying directly beneath the body of the weights, a finger carried by said plate, and an alarm mechanism having a post arranged to engage said finger and maintain the alarm mechanism inoperative.

2. An alarm mechanism comprising a case, vertical ways therein, a weight suspended in each of said ways, a plate pivoted at its ends in the case, said plate being slotted to extend rearward into said ways to position its rear edge directly beneath the body of the weights, a finger carried by the forward edge of said plate, and an alarm mechanism having a post arranged to engage said finger and maintain the alarm mechanism inoperative.

3. A fire or burglar alarm, comprising a case, vertical ways therein, sliding weights W suspended in said ways, and a plate pivoted at its two ends in said case under said weights, so as to be adapted to be tilted by any of the weights W falling upon the same, a weight to hold said pivoted plate in its normal position, an alarm mechanism comprising a vibrating-hammer mechanism and a bell, a finger on the pivoted plate adapted to engage and hold said hammer mechanism of the alarm against vibration, while the pivoted plate remains in its normal position, but releasing the same upon said pivoted plate being tilted, by any of the weights W falling thereon; and means for operatively suspending said weights W, substantially as described.

In testimony whereof I have signed my name to this specification in the presence of the subscribing witnesses.

IRA S. BUNKER.

Witnesses:
D. R. NICHOLS,
V. E. BOYAR,
LULA E. BUBB.